United States Patent [19]
Conner

[11] Patent Number: 6,085,459
[45] Date of Patent: Jul. 11, 2000

[54] VASE CONSTRUCTION AND METHOD OF USING SAME WITH TABLE UMBRELLA ASSEMBLY

[76] Inventor: Patricia Conner, 4419 Roma Ct., Marina del Rey, Calif. 90292

[21] Appl. No.: 09/109,430

[22] Filed: Jul. 2, 1998

Related U.S. Application Data

[63] Continuation-in-part of application No. 08/827,806, Apr. 11, 1997, abandoned.

[51] Int. Cl.⁷ ..................................................... A01G 9/02
[52] U.S. Cl. ............................................................ 47/41.01
[58] Field of Search ............................................ 47/41.01

[56] References Cited

U.S. PATENT DOCUMENTS

| | | |
|---|---|---|
| D. 60,174 | 1/1922 | Saito . |
| D. 226,279 | 2/1973 | Byerly . |
| D. 278,521 | 4/1985 | Baird et al. .............................. D11/153 |
| D. 382,511 | 8/1997 | Azarian .................................. D11/143 |
| 585,486 | 6/1897 | Snow . |
| 933,654 | 9/1909 | Lippincott . |
| 949,452 | 2/1910 | Smith, Jr. . |
| 1,499,473 | 7/1924 | Price . |
| 1,683,271 | 9/1928 | Thompson et al. . |
| 2,813,619 | 11/1957 | Gerowin . |
| 3,747,268 | 7/1973 | Linder ......................................... 47/34 |
| 4,707,256 | 11/1987 | Gerteis ..................................... 210/236 |
| 4,847,741 | 7/1989 | Boettinger ................................ 362/431 |

*Primary Examiner*—Michael J. Carone
*Assistant Examiner*—Joanne C. Downs
*Attorney, Agent, or Firm*—Oppenheimer, Wolff & Donnelly LLP

[57] ABSTRACT

A new and improved light weight plastic vase, includes a two part light weight plastic construction. The respective halves of the vase construction each comprise a flower container and have a base portion having a base width and a top portion having a wider width mouth. The top and bottom portions are integrally connected to one another at their tops and bottoms respectively and integrally connected to a common wall member. The common wall member of each half includes grooves and tongues which are spaced apart from one another about a centrally disposed pole receiving recess. The grooves, tongues and recess each extend in the direction of the longitudinal axis of the common wall. In an exemplary embodiment, the tongues and grooves of the respective halves of the vase construction slidably engage one another to help secure the vase to a table umbrella pole which in turn supports the vase in an upright manner without the risk of the vase being overturned accidentally. In an alternative embodiment, the vase is secured about a table umbrella pole by locking tabs which engage their respective notches, and splines which are maintained within grooves substantially along the length of the vase.

16 Claims, 5 Drawing Sheets

VASE CONSTRUCTION AND METHOD OF USING SAME WITH TABLE UMBRELLA ASSEMBLY

This application is a continuation-in-part of application Ser. No. 08/827,806, filed Apr. 11, 1997, now abandoned. The entire contents of this application are hereby incorporated by reference.

TECHNICAL FIELD

The present invention relates in general to flower vases and more particularly relates to a two part lightweight plastic vase construction that facilitates use of the vase for long stem floral arrangements with a table umbrella assembly.

BACKGROUND ART

There have been many types and kinds of vase and planter constructions used to facilitate the arranging of flowers in various settings, such as on a lamp post or a wall. For example reference may be made to the following U.S. Pat. Nos.: 1,499,473; 1,683,271; 3,747,268; 4,847,741; Des. 60,174; Des. 226,279; and Des. 278,521.

As disclosed in the foregoing mentioned patents, various vase and planter constructions are mountable to posts for floral display purposes. In this manner, a floral arrangement may be positioned in an unusual setting for eye catching purposes. For example, U.S. Pat. No. 1,499,473 discloses a flower box which is adapted to be mounted to an upright lamp post.

While such vase and planter constructions may have been satisfactory for some applications, it would be highly desirable to have a new and improved vase construction which enables long stem flowers to be arranged and displayed without an undue risk of the long stem flowers causing the vase to be accidentally overturned. The arranging and displaying of long stem flowers, such as long stem roses in a vase constructed of a light weight plastic material has an inherent risk of the flower vase being accidentally overturned due to the top heavy flowers and stems bearing too much pressure on the sides of the vase or due to wind or the accidental bumping of the table. Thus, establishments with outdoor facilities and tables have been reluctant to provide large long stem floral arrangements on such tables for the enjoyment of those utilizing their facilitates.

Therefore it would be highly desirable to have a new and improved vase construction which can be utilized readily for the arranging and displaying of long stem flowers in a vase constructed of a light weight plastic material without the unwanted and undesired risk of the long stem floral arrangement being accidentally overturned.

DISCLOSURE OF EMBODIMENT OF INVENTION

Therefore the principal object of the present invention is to provide a new and improved vase construction and a method of assembly that permits the arranging and displaying of long stem floral arrangements without the undesired and unwanted risk of the floral arrangement being accidentally overturned when being displayed on an outdoor table, such as an outdoor umbrella table.

Briefly, the above and further objects of the present invention are realized by providing a new and improved light weight plastic vase, which can be readily and conveniently utilized for arranging and displaying long stem flowers without the unwanted and undesired risk of the arrangement be accidentally being overturned when being displayed on an outdoor table, such as an outdoor umbrella table.

The vase includes a two part light weight plastic construction where the respective halves of the construction are secured to a upright pole, such as to a table umbrella pole. Each half of the vase construction includes an elongated base portion having a narrow width and an elongated top portion having a wide mouth opening. Top and bottom portions of the construction are integrally connected to an elongated common wall member having about twice the longitudinal length of either the base portion or the top portion. The common wall member includes grooves and tongues which are spaced apart from one another about a centrally disposed recess, where the grooves, tongues and recess each extend in the direction of the longitudinal axis of the common wall. The tongues and grooves of the respective halves of the vase construction slidably engage one another to help secure the vase to the table umbrella pole, which in turn, supports the vase in a fixed secured upright manner without the risk of the vase being overturned accidentally. Alternatively, notches and locking tabs, as well as grooves and splines, are employed to help secure the vase to a table umbrella pole where the locking tabs engage their respective notches and the splines are maintained within the grooves substantially along the length of the vase.

BRIEF DESCRIPTION OF DRAWINGS

The above-mentioned and other objects and features of this invention and the manner of attaining them will become apparent, and the invention itself will be best understood by reference to the following description of an embodiment of the invention taken in conjunction with the accompanying drawings, wherein.

DESCRIPTION OF THE PREFERRED EMBODIMENT

Figures 3, 4, 5, 6, 12:
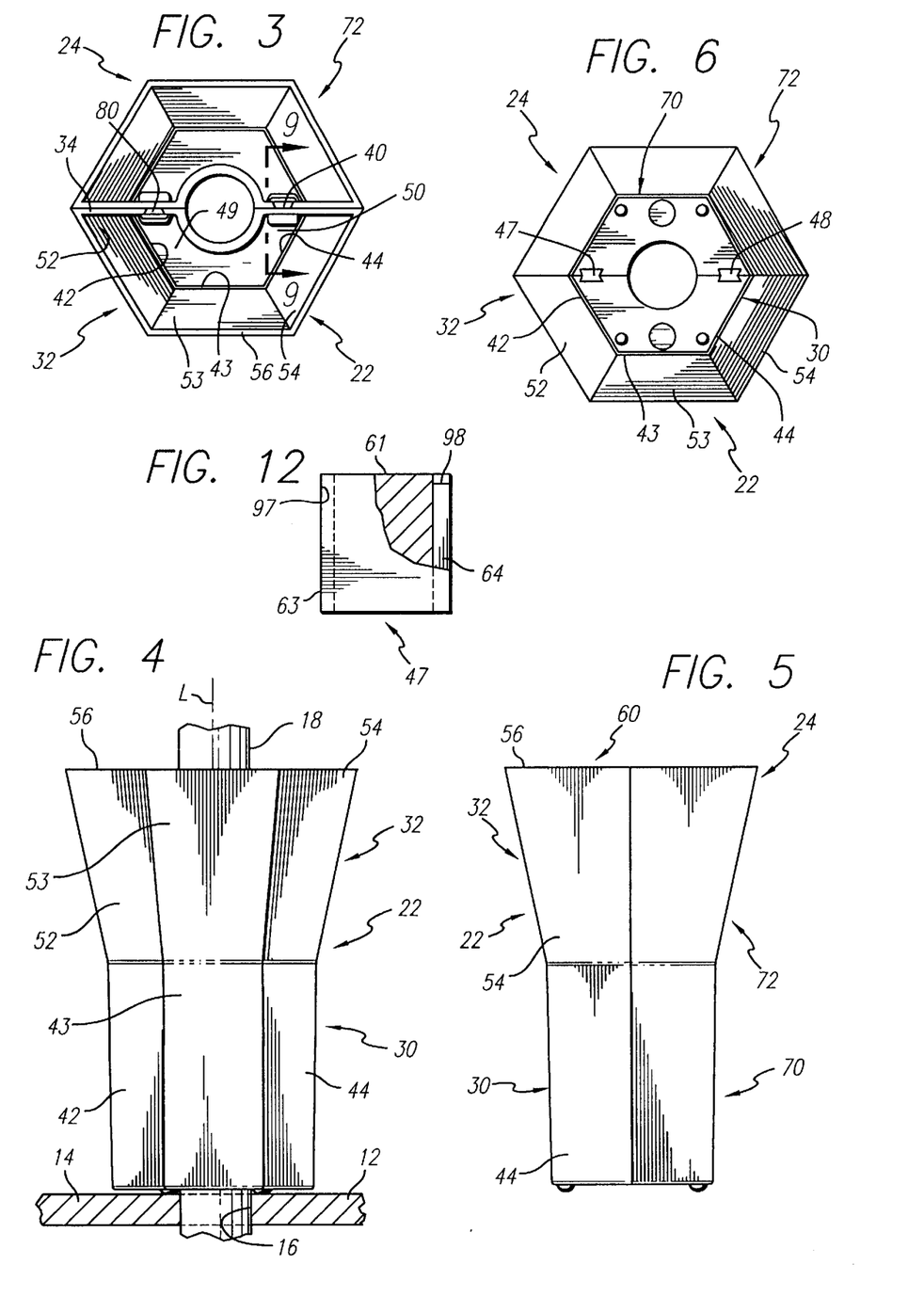
FIG. 3 is a top plan view of the vase construction of FIG. 1.
FIG. 4 is a front elevational view of the vase construction of FIG. 1.
FIG. 5 is a side elevational view of the vase construction of FIG. 1.
FIG. 6 is a bottom plan view of the vase construction of FIG. 1.
FIG. 12 is a partially broken away cross-sectional view of a double dovetail insert taken substantially along plane 12—12.

Referring now to the drawings, and more particularly to FIGS. 1–6 thereof, there is shown one embodiment of a new and improved umbrella pole vase 10 which is constructed in accordance with the present invention. As best seen in FIG. 4, the vase 10 is adapted to be supported from below by a top table surface 12 of a table 14 having a centrally disposed hole 13 for supporting therein in a substantially upright manner an umbrella pole 18 and an associated umbrella (not shown). The vase 10 can be readily attached about the umbrella pole 18 in accordance with the method of attachment of the present invention.

The vase 10 generally comprises a first elongated container or shell 22 and a second elongated container or shell 24 which are interconnected slidably removably together about the longitudinal axis (L) of the umbrella pole 18 with the bottom of the vase 10 being supported from below by the surface 12 of the table 14. The manner of interconnecting the first and second containers 22 and 24 to form a pole receiving space 16 will be described hereinafter in greater detail.

The first and second containers 22 and 24 form separate flower receiving compartments 23 and 25 respectively that facilitate the displaying of different kinds of floral arrangements. In this regard, one kind of long stem floral arrangement may be arranged in the first compartment 23, while a different kind of long stem floral arrangement may be arranged in the second compartment 25.

As the first and second containers 22 and 24 are mirror constructions and are interconnected in an abutting manner about the pole 18, mirror floral arrangements may be arranged in the respective containers 22 and 24 to form a large floral arrangement at the center of the table 14. Moreover, since the containers 22 and 24 are supported about the pole 18 large bunches of long stem flowers may be arranged in the containers 22 and 24 without the undesired and unwanted accidental tipping over of the vase 10 due to wind or the accidental bumping of the table 14. As will be explained hereinafter in greater detail, the elongated construction of the vase 10 coupled with a narrow base and a wide mouth construction facilitates the arrangements of long stem flowers and greens in a very striking and eye pleasing manner. As the first and second containers 22 and 24 are substantially similar in construction, a detailed description of the second container 24 will be limited.

Figures 1, 2, 10, 11:
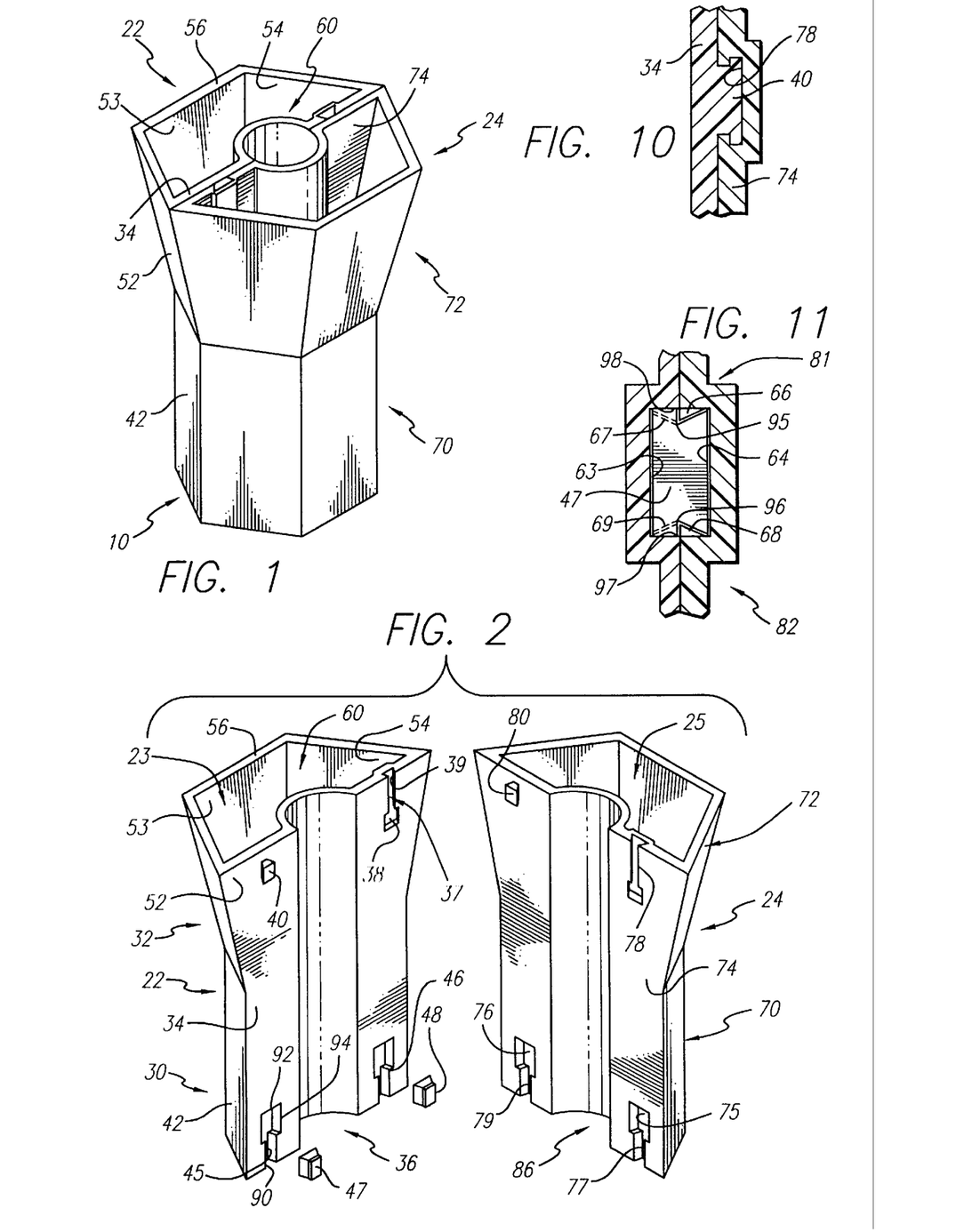
FIG. 1 is a perspective view of a vase which is constructed in accordance with the present invention.
FIG. 2 is a perspective view of two elongated flower containers that form the vase construction of FIG. 1.
FIG. 10 is a cross sectional view of a tongue and groove formed in the top portions of respective ones of the containers of FIG. 9 taken substantially along plane 10—10.
FIG. 11 is a cross section view of a dovetail entry and insert at the bottom portions of respective ones of the containers of FIG. 9 taken substantially along plane 11—11.

Considering now the first container 22 in greater detail with reference to FIG. 2, the first container 22 generally includes a semi hexagonal base portion 30 and a trihedral top portion 32 which are integrally connected together at their respective outer side edges to a common upstanding connector wall member 34 having about twice the longitudinal length of either the base portion 30 or the top portion 32. The wall member 34 is about t inches thick, where t is about 0.2187 inches thick in an exemplary embodiment.

In order to permit the common wall member 34 to accommodate a portion of the pole 18, the common wall member 34 has a centrally disposed recess 36 having a generally semi-circular configuration. The recess 36 extends the entire longitudinal length of the wall 34, and has a sufficient width and depth to permit about one half of the cross sectional diameter of the pole 18 to be received therein. The longitudinal length of the wall 34 is about y inches, where y is about 10 inches.

An elongated groove 37 and an elongated outwardly projecting tongue 40 are spaced apart from one another on opposite sides of the recess 36 on the outer surface of the wall 34 at the top portion 32. The groove 37 and the tongue 40 are parallel to one another extending along the longitudinal axis of the wall member 34.

As best seen in FIG. 2, a pair of spaced apart dovetail notches such as a left dovetail slot 45 and a right dovetail slot 46 are disposed in the common wall 34 at the bottom portion 30. The dovetails 45 and 46 are disposed on opposite sides of the recess 36 and each is adapted to receive a double dovetail insert, such as an insert 47 and an insert 48. As will be explained hereinafter in greater detail, the groove 37 and the tongue 40 and the dovetail slots 45 and 46 and their associated inserts 47 and 48 cooperate together to help facilitate the connecting together of the first and second containers 22 and 24 respectively in an abutting arrangement about the longitudinal axis of the pole 18 so that separate bunches of flowers may be arranged and displayed on the table 14 about the pole 18.

Considering now the base portion 30 in greater detail with reference to FIG. 2, the base portion 30 has a unitary construction formed of a molded plastic material and generally includes three integrally connected upstanding wall members 42–44. The wall members 42 and 44 are integrally connected at one of their respective side edges to the wall member 43 and at the other one of their respective side edges to the common wall member 34 to define a bottom container space 49 having an average diameter (D) of about x inches, or a narrow width of about w inches, where w is about 5 inches in an exemplary embodiment.

The diameter (D) of the space 49 is sufficiently large for receiving and supporting a bottom portion of the bunch of flowers while the volume (V) of the space 49 is sufficiently small to hold the bottom portion of the bunch of flowers in a substantially tight compact grouping. This configuration helps facilitate the arranging of the long stem flowers in an eye pleasing manner for floral arrangement purposes.

The bottom peripheral ends of the walls 42–44 as well as the bottom peripheral end of the common wall 34 are integrally connected to a bottom floor member 50 to form a water tight arrangement.

Considering now the top portion 32 in greater detail with reference to FIG. 2, the top portion 32 has a unitary construction formed of a similar molded plastic material as the base portion 30. In this regard, the first container 22 and the second container 24 are formed in a plastic mold utilizing conventional plastic molding techniques. Thus, the vase construction 10 is relatively inexpensive to manufacture.

The top portion 32, generally includes three integrally connected outwardly tapered wall members 52–54. The wall members 52 and 54 are integrally connected at one of their respective side edges to the wall member 53 and at the other one of their respective side edges to the common wall member 34. The base or bottom ends of the wall members 52–54 are integrally connected to the top ends of the wall members 42–44 respectively.

The top ends of the wall members 52–54 terminate in a lip 56 that defines an opening 60 to the container 22. The overall width W of the opening 60 in an exemplary embodiment is about 7.5 inches and is substantially larger than the overall width W of the base portion 30 to allow the long stem flowers to fall away from one another at about an intermediate length of respective ones of the stems. In this regard, the wall member 34 cooperates with the tapered wall member 52–54 to define a top container space that is sufficiently large for receiving and supporting the flowers in a loose grouping that facilitates the adding of long stem greens between selected ones of the long stem flowers for floral arrangement purposes.

Considering now the second container 24 in greater detail with reference to FIG. 2, the second container 24 includes a base portion 70 and a top portion 72 having a common wall member 74 with a centrally disposed recess 86 that extends the entire longitudinal length of the wall 74. The configuration of the second container 24 is substantially identical to the first container 22 except for the common wall member 74.

In order to facilitate the interconnection between the first container 22 and the second container 24, the common wall member 74 at the top portion 72 includes an elongated groove 78 and an elongated outwardly projecting tongue 80 that extend along the longitudinal axis of the wall 74. The groove 78 and tongue 80 are parallel and spaced apart from one another on opposite sides of the recess 86 but in an opposite orientation than the groove 37 and the tongue 40.

In order to facilitate the securing of the base portion 30 and the base portion 70 together, the base portion 70 includes a pair dovetail slots 75 and 76 which are disposed in the common wall 74. The dovetail slots 75 and 76 are disposed opposite from one another on opposite sides of the recess 86. Each of the slots 75 and 76 is adapted to receive therein the double dovetail inserts 47 and 48 respectively.

More specifically when the common wall members 34 and 74 are held facing one another in a common plane, the groove 37 is disposed opposite the tongue 80 and the tongue 40 is disposed opposite the groove 78. With this arrangement, the first container 22 and the second container 24 can be secured removably together by aligning the containers 22 and 24 about the pole 18 so their respective dovetails inserts 47 and 48 are received in respective ones of the dovetail slots 45, 46, 75 and 76, and then when the containers 22 and 24 are so aligned, sliding the tongues 40 and 80 into respective ones of the grooves 78 and 37 to mount the vase 10 to the pole 18. In this regard, the recesses 36 and 86 form the pole receiving space 16 that is sufficiently large to receive the longitudinal axis of the pole 18 therein. In this manner, the vase 10 is held in an upright manner about the pole 18.

The diameter d of the opening 16 is between about 1 inch and about 3 inches, in an exemplary embodiment. A more preferred opening space 16 is about 1.25 inches and about 2 inches, and the most preferred opening space is about 1.5 inches, in an exemplary embodiment.

Considering now the dovetail slots 45,46 and 75,76 in greater detail with reference to FIGS. 7–11, the slots 45,46 and 75,76 are substantially identical to one another so only slot 45 will be described in greater detail.

Figures 7, 8:
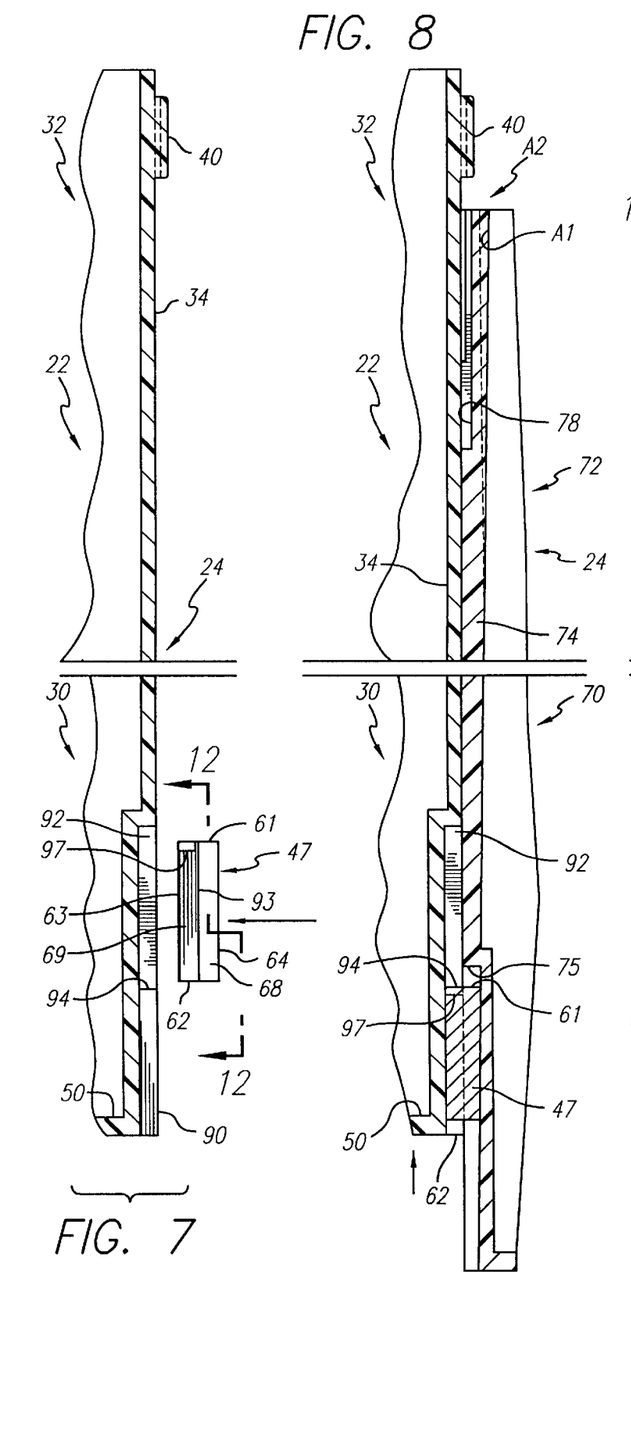
FIGS. 7–9 are the sequence steps for joining and securing the separate containers of FIG. 2 into a unit construction.

Considering now the dovetail slot 45 in greater detail with reference to FIG. 2, the slot 45 has an elongated narrow dovetail bottom portion 90 and an elongated wide top entry portion 92. The top portion 92 has a sufficient depth for receiving therein a portion of the insert 47 as best seen in FIG. 8. Additionally, the narrow portion 90 is dovetailed to receive in a removably securing manner, the double dovetail insert 47. As will be explained hereinafter in greater detail, the wide portion 92 includes a stop 94 that engages a retaining wall portion 97 of the insert 47 to prevent it from sliding downwardly out of the bottom portion 90.

Considering now the double dovetail inserts 47 and 48 in greater detail, only insert 47 will be described in greater detail as both inserts 47 and 48 are substantially identical in construction.

Considering now the double dovetail insert 47 in greater detail with reference to FIG. 7 and 11, the insert 47 has a block-like shape with a top wall member 61, a bottom wall member 62, a back-wall member 63 and a front wall member 64. The insert 47 also includes a right cutout portion 81 and a left cutout portion 82 that define a pair of right and left side wall members 66–67 and 68–69 respectively that are tapered inwardly from their respective outer peripheries to their bottoms 95 and 96 respectively.

As best seen in FIGS. 7 and 11, the left side wall member 68 extends the entire longitudinal length of the double dovetail member 47. The left side wall member 69 extends along a substantial portion of the longitudinal length of member 47 but stops short however, terminating in the flat retaining wall member 97. In a similar manner, the right side wall member 66 extends the entire longitudinal length of the double dovetail member 47, while the right side wall member 67 terminates in another flat retaining wall member 98.

As best seen in FIGS. 7 and 8, the flat retaining wall members 97 and 98 engage the stop 94 for helping to retain the insert 47 in the slot 45 as will be explained hereinafter in greater detail.

Considering now the groove 37 in greater detail, the groove 37 has a T-like shape which is complementary in shape to the tongue 40. In order to enable the tongue 80 to be received within the groove 37 during the alignment and assembly of the two containers 22 and 24, the groove 37 includes a wide flat bottom entry portion 38 having a generally rectangular box like shape and an elongated narrow top portion 39 having a generally T-like shape. The entry portion 38 has a maximum width of about z inches, where z is about 0.3437 inches. As best seen in FIG. 2, the groove 37 is disposed in the common wall member 34 and extends downwardly from the lip 56 along the longitudinal axis of the common wall member 34.

Considering now the assembly of the vase construction 10 in greater detail with reference to FIGS. 7–10, the assembly beings by inserting the double dovetail inserts 47 and 48 into the large entries of their respective slots 45 and 46, such as the entry 92 as best seen in FIG. 7.

The double dovetail inserts 47 and 48 are then physically moved downwardly to the bottom of their respective slots 45 and 46. For example, as best seen in FIG. 8, the insert 47 is moved downwardly into the narrow dovetail portion 90 until the retaining wall members 97 and 98 engage the stop 94 positioning the bottom wall member 62 of the insert 47 adjacent the floor member 50.

The container 24 is then brought to a first alignment position A1 to align the inserts 47 and 48 with the flat wide entries in the slots 75 and 76 respectively. In this regard, as best seen in FIG. 8, the container 22 is aligned above the container 24 as the insert 47 and 48 are positioned in the bottom portions of their respective slots 45 and 46.

Once the inserts 47 and 48 are aligned with the flat entries 83 and 84 of container 24, the container 24 is moved forward toward the container 22 to a second alignment position A2 with the inserts 47 and 48 being received in the flat entries 83 and 84 as best seen in FIG. 8.

In the second alignment position A2, the common wall members 34 and 74 are abutted flat against each other with the tongue 80 received in the entry 38 of groove 37 and the tongue 40 disposed above and in alignment to be received in the groove 78.

Figure 9:
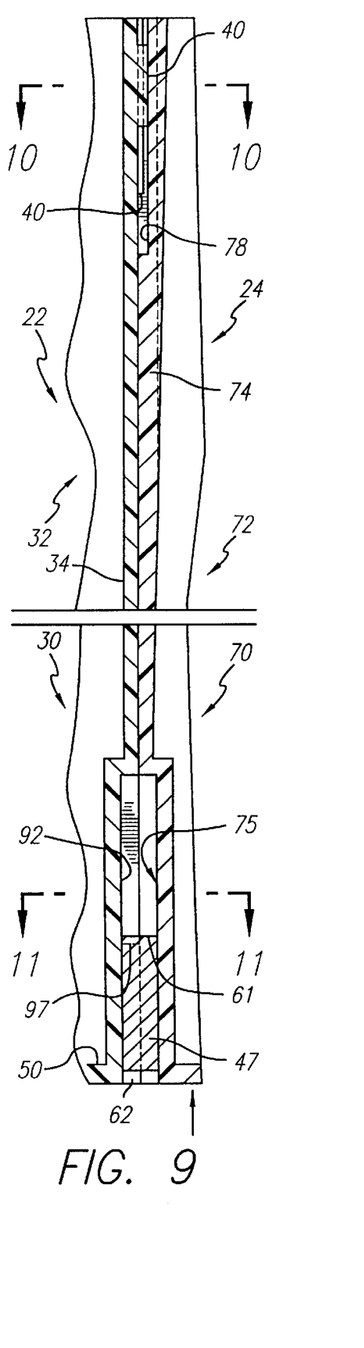

In the final step of assembly, the container 24 is moved upwardly parallel to container 22 allowing the tongue 80 to move upwardly within the groove 37 and the tongue 40 to move downwardly within the groove 78 until the containers 22 and 24 are secured together in alignment as best seen in FIG. 9. In this regard, the dovetail portions of the slots 75 and 76, such as dovetail portions 77 and 79 respectively receives the inserts 47 and 48 therein to join the bottom portions 30 and 70 together.

Considering now the tongue 40 in greater detail with reference to FIGS. 2 and 10, the tongue 40 is generally T-shaped having a back I or bar shaped portion 87 and a front I or bar shaped portion 88. The back I or bar shaped portion 87 is integrally connected to the common wall member 34 projecting outwardly therefrom and extending along longitudinal axis of the wall member 34. The I-shaped portion 87 is also disposed below and spaced apart from the lip 56 a sufficient distance to allow the alignment and assembly of the two containers 22 and 24 into the vase construction 10 as will be described hereinafter in greater detail. The front I shaped portion 88 is integrally to the back portion 87 and extends along the horizontal axis of the wall member 34.

FIG. 13–20 disclose an alternative embodiment of the present invention. The vase construction of FIG. 13 externally appears similar to the vase shown in the previous embodiment in FIG. 1 and includes an elongated vase 110 coupled with a narrow base and a wide mouth. This construction also facilitates the arrangement of long stem flowers and greens in an eye pleasing manner.

Although not shown, similar to FIG. 4, the vase 110 is also adapted to be supported from below by a top table surface of a table having a centrally disposed hole for supporting therein in a substantially upright manner an umbrella pole and an associated umbrella. The vase 110 can be readily attached about an umbrella pole in accordance with the method of attachment of this alternative embodiment.

The vase 110 generally comprises a first elongated container or shell 122 and a second elongated container or shell 124. The first and second containers 122 and 124 are interconnected together about the longitudinal axis (1) of the umbrella pole. The manner of interconnecting the first and second containers 122 and 124 to form a pole receiving space will be described hereinafter in greater detail.

Figure 14:
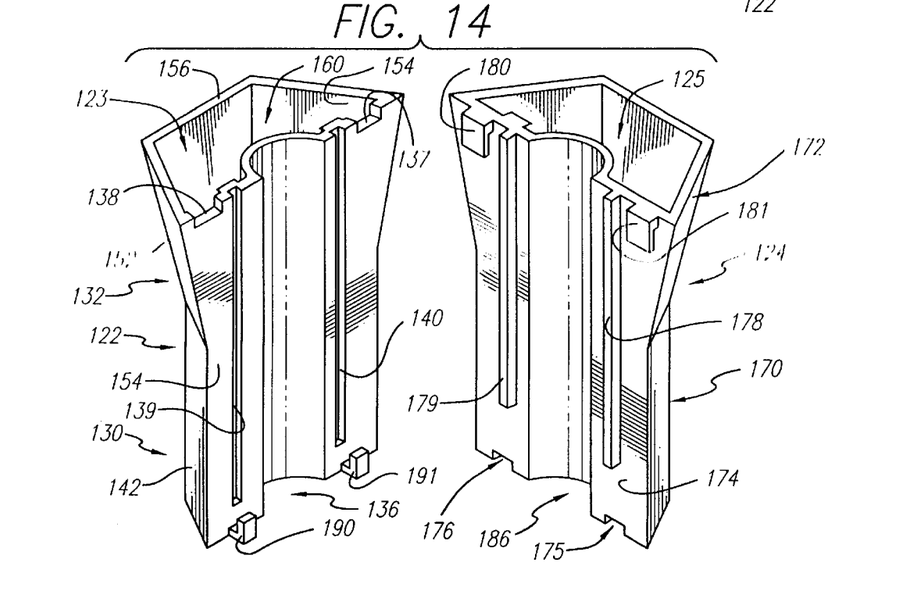
FIG. 14 is a perspective view of two elongated flower containers that form the vase construction of FIG. 13.

As best seen in FIG. 14, the first and second containers 122 and 124 form separate flower receiving compartments 123 and 125 respectively that facilitate the displaying of different kinds of floral arrangements. The first and second containers 122 and 124 are mirror constructions and are interconnected in an abutting manner substantially along the length of the vase 110. This alternative interconnection also allows large bunches of long stem flowers to be arranged in the containers 122 and 124 without the undesired and unwanted accidental tipping over of the vase 110. As the first and second containers 122 and 124 are substantially similar in construction, a detailed description of the second container 124 will be limited.

Considering now the first container 122 in greater detail with reference to FIG. 14, the first container 122 generally includes a semi-hexagonal base portion 130 and a trihedral top portion 132 which are integrally connected together at their respective outer side edges to a common upstanding connector wall member 134 having about twice the longitudinal length of either the base portion 130 or the top portion 132. The wall member 134 is about t inches thick, where t is about 0.2187 inches thick in this alternative embodiment.

In order to permit the common wall member 134 to accommodate a portion of the pole, the common wall member 134 has a centrally disposed recess 136 having a generally semicircular configuration. The recess 136 extends the entire longitudinal length of the wall 134, and has a sufficient width and depth to permit about one half of the cross sectional diameter of the pole to be received therein. The longitudinal length of the wall 134 is about y inches, where y is about 10 inches in this alternative embodiment. A pair of elongated grooves 139 and 140 are spaced apart from one another on opposite sides of the recess 136. The grooves 139 and 140 are parallel to one another and extend along the longitudinal axis of the wall member 134.

At the base portion 130 of the first container 122, a pair of spaced apart locking tabs 190 and 191 are disposed in the common wall 134. The locking tabs 190 and 191 are disposed on opposite sides of the recess 136 and extend outward and upward from the common wall 134. Each locking tab 190 and 191 is adapted to be inserted into associated receiving notches 175 and 176 of the second container 124 to facilitate the connecting together of the bases 130 and 170 of the first and second containers 122 and 124.

Additionally, at the top portion 132 of the first container 122, a pair of spaced apart receiving notches 137 and 138 are disposed in the common wall 134. The notches 137 and 138 are disposed on opposite sides of the recess 136 and each is adapted to receive a respective locking tab 180 and 181 from the second container 124. As will be explained hereinafter in greater detail, the grooves 139 and 140 with their associated splines 178 and 179, and the notches 137 and 138 with their associated locking tabs 180 and 181, cooperate together to help facilitate the connecting of the top portions 132 and 172 of the first and second containers 122 and 124.

Figure 16:
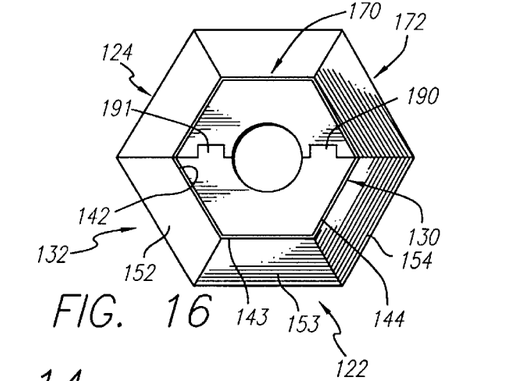
FIG. 16 is bottom plan view of the vase construction of FIG. 13.

Considering now the base portion 130 in greater detail with reference to FIG. 14 and 16, the base portion 130 has a unitary construction formed of a molded plastic material and generally includes three integrally connected upstanding wall members 142-144. The wall members 142 and 144 are integrally connected an one of their respective sides edges to the wall members 143 and at the other one of their respective side edges to the common wall member 134 to define a bottom container space 149 having an average diameter (D) of about x inches, or a narrow width of about 2 inches, where w is about 5 inches in this alternative embodiment. The bottom peripheral ends of the walls 142–144 as well as the bottom peripheral end of the common wall 134 are integrally connected to a bottom floor member 150 to form a water tight arrangement.

The diameter (D) of the space 149 is sufficiently large for receiving and supporting a bottom portion of the bunch of flowers while the volume (V) of the space 149 is sufficiently small to hold the bottom portion of the bunch of flowers in a substantially tight impact grouping. This configuration helps facilitate the arranging of the long stem flowers in an eye pleasing manner for floral arrangement purposes.

Figure 15:
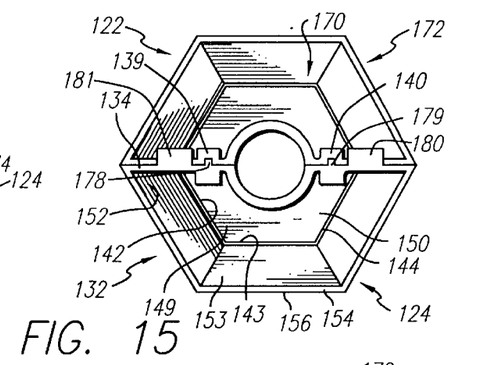
FIG. 15 is a top plan view of the vase construction of FIG. 13.

Considering now the top portion 132 in greater detail with reference to FIG. 14 and 15 the top portion 132 has a unitary construction formed of a similar molded plastic material as the base portion 130. In this regard, the first container 122 and the second container 124 are formed in a plastic mold utilizing conventional plastic molding techniques. Thus, the vase construction 110 is relatively inexpensive to manufacture.

The top portion 132, generally includes three integrally connected outwardly tapered wall members 152–154. The wall members 152 and 154 are integrally connected at one of their respective sides edges to the wall member 153 and at the other one of their respective sides edges to the common wall member 134. The base or bottom ends of the wall members 152–154 are integrally connected to the top ends of the wall members 142–144 respectively.

The top ends of the wall members 152–154 terminate in a lip 156 that defines an opening 130 to the container 122. The overall width W of the opening 130 is about 7.5 inches in an exemplary embodiment and is substantially larger than the overall width w of the base portion 130 to allow the long stem flowers to fall away from one another at about an intermediate length of respective ones of the stems. In this regard, the wall member 134 cooperates with the tapered wall member 152–154 to define a top container space that is sufficiently large for receiving and supporting the flowers in a lose grouping that facilitates the adding of long stem greens between selected ones of the long stem flowers for floral arrangement purposes.

Considering now the second container 124 in greater detail with reference to FIG. 14, the second container 124 includes a base portion 170 and a top portion 172 having a common wall member 174 with a centrally disposed recess 186 that extends the entire longitudinal length of the wall 174. The configuration of the second container 124 is similar to the first container 122 except for the common wall member 174.

To facilitate the securing of the base portion 130 to the base portion 170, the base portion 170 of the common wall 174 includes a pair notches 175 and 176 which are disposed opposite from one another on opposite sides of the recess 186. Each of the notches 175 and 176 is adapted to receive therein the locking tab 190 and 191 respectively. Additionally, to facilitate the securing of the top portion 132 to the top portion 172, the top portion 172 of the common wall 174 includes a pair locking tabs 180 and 181 which are disposed opposite from one another on opposite sides of the recess 186. The locking tabs 180 and 181 extend outward and downward from the common wall 174. Further, the locking tabs 180 and 181 are adapted to be inserted into associated receiving notches 137 and 138 respectively to facilitate the connecting together of the bases 130 and 170 of the first and second containers 122 and 124.

In order to facilitate the interconnection between the first container 122 and the second container 124, the common wall member 174 at the top portion 172 includes a pair of outwardly projecting elongated splines 178 and 179 that extend along the longitudinal axis of the wall 174. The splines 178 and 179 are parallel to one another and spaced apart from one another on opposite sides of the recess 186. As will be explained hereinafter in greater detail, splines 178 and 179 and their associated grooves 139 and 140 serve as guides for aligning and connecting the first and second containers 122 and 124.

Figure 13:
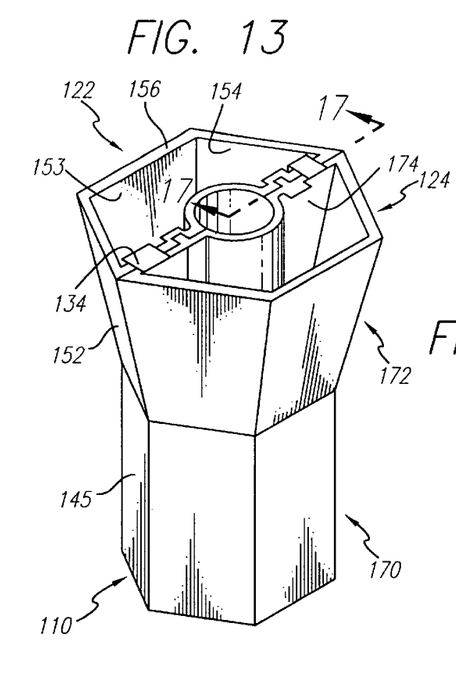
FIG. 13 is a perspective view of vase which is constructed in an alternative embodiment of the present invention of grooves and tongues substantially along the length of the vase.

More specifically, when the common wall members 134 and 174 are held facing one another in a common plane, the groove 139 is disposed opposite the spline 178 and the groove 140 is disposed opposite the spline 179. With this arrangement, the first container 122 and the second container 124 can be secured removably together by aligning the splines 178 and 179 with the grooves 139 and 140 of the containers 122 and 124 about the pole so locking tabs 180, 181, 190 and 191 are received in respective notches 137, 138, 175 and 176. Then when the containers 122 and 124 are so aligned, with the splines 178 and 179 in their respective ones of the grooves 139 and 140, and the locking tabs 180, 181, 190 and 191 received in their respective notches 137, 138, 175 and 176, the vase 110 is mounted around the pole. In this regard, the recesses 136 and 186 form a pole receiving space that is sufficiently large to receive the longitudinal axis of the pole therein. In this manner, the vase 110 is held in an upright manner about the pole as seen in FIG. 13.

Figure 17:
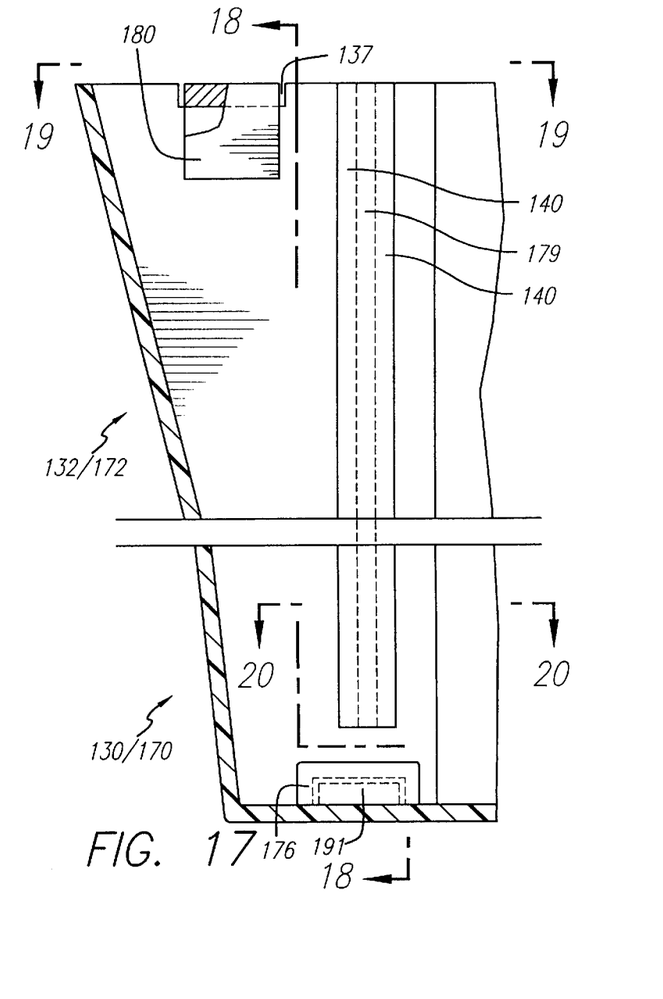
FIG. 17 is a cross sectional view of the vase construction of FIG. 13 taken substantially along the plane 17—17.

As is best seen in FIG. 17, a cross sectional front view is shown of half of the interconnected common walls 134 and 174. To secure the tops 132 and 172 of the first and second containers 122 and 124, the locking tab 180 of the second container 124 is received within the notch 137 of the first container 122. To secure the bases 130 and 170 of the first and second containers 122 and 124, the locking tab 191 of the first container 122 is received within the notch 176 of the second container 124. Additionally, the spline 179 of the second container 124 is contained within the groove 140 of the first container to aid in aligning and interconnecting the first and second containers 122 and 124.

Figure 18:
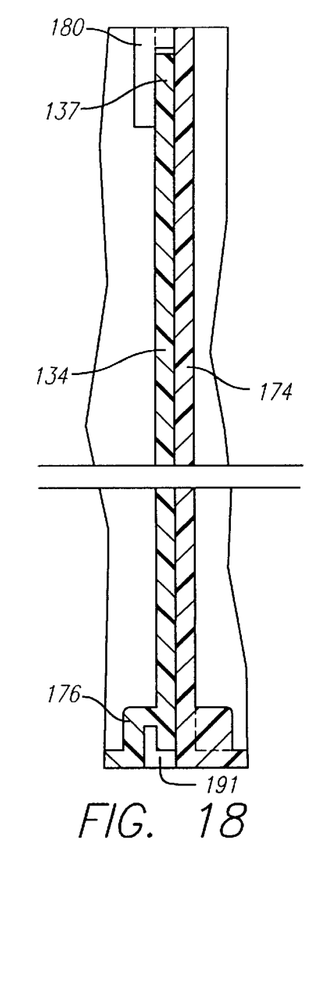
FIG. 18 is a detailed section view of the vase common walls interconnection of FIG. 17 taken substantially along plane 18—18.

FIG. 18 is a cross sectional side view of the common walls 134 and 174 interconnected along the length of the vase taken along the plane 18—18 in FIG. 17. Common walls 134 and 174 are abutted together and locking tabs 180 and 191 are contained within their respective notches 137 and 176.

Figure 19:
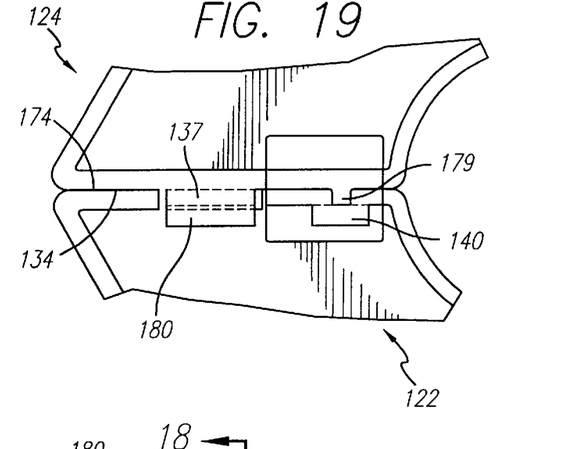
FIG. 19 is a detailed section view of the groove and spline interconnection and the locking tab and notch interconnection of FIG. 17 taken substantially along plane 19—19.

FIG. 19 shows the interconnection of the first and second containers 122 and 124 from a top plane view with the common walls 134 and 174 abutted together. The spline 179 of the second container 124 is inserted into the groove 140 of the first container 124 continuously along the length of the vase 110. Further, the locking tab 180 of the second container 124 is received within the notch 137 of the first container.

Figure 20:
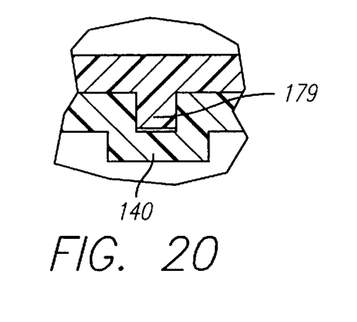
FIG. 20 is a detailed section view of the groove and spline interconnection of FIG. 17 taken substantially along plane 20—20.

FIG. 20 is a top plane view of the groove and spline interconnection taken along plane 20—20 of FIG. 17 from the base portions 130 and 170. The spline 179 of the second container 124 is inserted within the groove 140 of the first container 122 along substantially the length of the vase.

While a particular embodiment of the present invention has been disclosed, it is to be understood that various different modifications are possible and are contemplated within the true spirit and scope of the appended claims. There is no intention, therefor of limitations to the exact abstract or disclosure herein presented.

Concerning the construction of the splines 178 and 179 and the grooves 139 and 140, any geometry which serves to align and interconnect the first and second containers 122 and 124 may be used. Further, the locking tabs 180, 181, 190, and 191 and notches 137, 138, 175, and 176 may be implemented without splines 178 and 179 and grooves 139 and 140 and may be implemented by any means which secures and connects the first and second containers 122 and 124. Any geometry of the vase 10 may be used where the top portions 32 and 72 of the first and second containers 22 and 24 are wider than the base portions 30 and 70. Also, any geometry of the vase 110 may be used where the top portions 132 and 172 of the first and second containers 122 and 124 are wider than the base portions 130 and 170.

We claim:

1. A vase construction comprising:

a first elongated container forming a first flower receiving compartment for receiving and for supporting from below a bunch of long stem flowers, said container having a first connector wall with a centrally disposed recess extending the entire longitudinal length thereof, said recess having a sufficient depth and width to partially receive therein a pole for helping to support said first container in a substantially upright manner;

said first elongated container further including:

a base portion having integrally connected upstanding wall members being integrally connected to said first connector wall for helping to define a bottom container space for receiving and supporting a bottom portion of the stems of said bunch of flowers in a tight compact grouping for flower arrangement purposes; and a top portion having integrally connected outwardly tapered wall members integrally connected to said first connector wall for helping to define a top container space for receiving and supporting an intermediate portion of the stems in a loose grouping to facilitate the addition of long stem greens between selected ones of the long stems of said bunch of flowers for flower arrangement purposes;

a second elongated container forming a second flower receiving compartment separate from said first compartment and for receiving and supporting from below another bunch of long stem flowers, said second container having a second connector wall with another centrally disposed recess extending the entire longitudinal length thereof, said another recess having a sufficient depth and width to partially receive therein another portion of said pole for helping to support said second container in a substantially upright manner;

said second elongated container further including:

another base portion having integrally connected upstanding wall members being integrally connected to said second connector wall for helping to define another bottom container space for receiving and supporting a bottom portion of the stems of said another bunch of flowers in a tight compact grouping for flower arrangement purposes; and another top portion having integrally connected outwardly tapered wall members integrally connected to said second connector wall for helping to define another top container space for receiving and supporting an intermediate portion of the stems of said another bunch of flowers in a loose grouping to facilitate the addition of long stem greens between selected ones of said another bunch of long stem flowers for flower arrangement purposes;

said first and second connector wall containing a continuous connector means extending along the longitudinal axis of the connector walls adjacent both said base and top portions for helping to facilitate the connecting of said first container and said second container at both said base and top portions in an abutting arrangement about the longitudinal axis of said pole for flower displaying purposes;

wherein said continuous connector means comprises:

outwardly projecting elongated splines that extend continuously along said second connector wall wherein said splines are parallel to one another;

elongated grooves or openings that extend continuously along said first connector wall, said grooves being parallel to one another and consimilarly configured to said splines wherein said grooves are adapted to receive said splines to facilitate the alignment of said first and second connector walls;

locking tabs at least at said top portion of said second connector wall; and notches at least at said top portion of said first connector wall for receiving said locking tabs to facilitate the interconnection of said first and second connector walls.

2. A vase construction according to claim 1, wherein said first container and said second container each have a longitudinal length of about twice the width of said base portions.

3. A vase construction according to claim 1, wherein said top portions have a width dimension at their bottoms that is substantially equal to the width of said base portions.

4. A vase construction according to claim 1, wherein said first container further includes:

a semi hexagonal base portion having three integrally connected upstanding wall members, two of said three wall members being integrally connected at one of their respective ends to said first connector wall for helping to define a bottom container space for receiving and supporting a bottom portion of the stems of said bunch of flowers in a tight compact grouping for flower arrangement purposes; and a trihedral top portion having three integrally connected outwardly tapered wall members integrally connected at one of their ends to said three upstanding wall members, two of said tapered wall members being integrally connected at their respective side ends to said first connector wall for helping to define a top container space for receiving and supporting an intermediate portion of the stems in a loose grouping to facilitate the addition of long stem greens between selected ones of the long stems of said bunch of flowers for flower arrangement purposes.

5. A vase construction according to claim 4, wherein said second container further includes:

another semi hexagonal base portion having three integrally connected upstanding wall members, two of said three wall members being integrally connected at one of their respective ends to said second connector wall for helping to define another bottom container space for receiving and supporting a bottom portion of the stems of said another bunch of flowers in a tight compact grouping for flower arrangement purposes; and another trihedral top portion having three integrally connected outwardly tapered wall members integrally connected at one of their ends to said three upstanding wall members, two of said tapered wall members being integrally connected at their respective side ends to said second connector wall for helping to define another top container space for receiving and supporting an intermediate portion of the stems in a loose grouping to facilitate the addition of long stem greens between selected ones of said another bunch of flowers for flower arrangement purposes.

6. A vase construction comprising:

a first elongated container forming a first flower receiving compartment for receiving and for supporting from below a bunch of long stem flowers, said container having a first connector wall with a centrally disposed recess extending the entire longitudinal length thereof, said recess having a sufficient depth and width to partially receive therein a pole for helping to support said first container in a substantially upright manner;

said first elongated container further including:

a base portion having integrally connected upstanding wall members being integrally connected to said first connector wall for helping to define a bottom container space for receiving and supporting a bottom portion of the stems of said bunch of flowers in a tight compact grouping for flower arrangement purposes; and a top portion having integrally connected outwardly tapered wall members integrally connected to said first connector wall for helping to define a top container space for receiving and supporting an intermediate portion of the stems in a loose grouping to facilitate the addition of long stem greens between selected ones of the long stems of said bunch of flowers for flower arrangement purposes;

a second elongated container forming a second flower receiving compartment separate from said first compartment and for receiving and supporting from below another bunch of long stem flowers, said second container having a second connector wall with another centrally disposed recess extending the entire longitudinal length thereof, said another recess having a sufficient depth and width to partially receive therein another portion of said pole for helping to support said second container in a substantially upright manner;

said second elongated container further including:

another base portion having integrally connected upstanding wall members being integrally connected to said second connector wall for helping to define another bottom container space for receiving and supporting a bottom portion of the stems of said another bunch of flowers in a tight compact grouping for flower arrangement purposes; and another top portion having integrally connected outwardly tapered wall members integrally connected to said second connector wall for helping to define another top container space for receiving and supporting an intermediate portion of the stems of said another bunch of flowers in a loose grouping to facilitate the addition of long stem greens between selected ones of said another bunch of long stem flowers for flower arrangement purposes; and said first and second connector wall containing a continuous connector means extending alone the longitudinal axis of the connector walls adjacent both said base and top portions for helping to facilitate the connecting of said first container and said second container at both said base and top portions in an abutting arrangement about the longitudinal axis of said pole for flower displaying purposes;

wherein said continuous connector means comprises:

outwardly projecting elongated splines that extend continuously along said second connector wall wherein said splines are parallel to one another;

elongated grooves or openings that extend continuously along said first connector wall, said grooves being parallel to one another and consimilarly configured to said splines wherein said grooves are adapted to receive said splines to facilitate the alignment of said first and second connector walls;

locking tabs at least at said top portion of said second connector wall;

notches at least at said top portion of said first connector wall for receiving said locking tabs to facilitate the interconnection of said first and second connector walls;

locking tabs at said base portion of said first connector wall; and notches at said base portion of said second connector wall for receiving said locking tabs to facilitate the interconnection of said first and second connector walls.

7. A vase construction according to claim 6, wherein said first container and said second container each have a longitudinal length of about twice the width of said base portions.

8. A vase construction according to claim 6, wherein said top portions have a width dimension at their bottoms that is substantially equal to the width of said base portions.

9. A vase construction according to claim 6, wherein said first container further includes:

a semi hexagonal base portion having three integrally connected upstanding wall members, two of said three wall members being integrally connected at one of their respective ends to said first connector wall for helping to define a bottom container space for receiving and supporting a bottom portion of the stems of said bunch of flowers in a tight compact grouping for flower arrangement purposes; and a trihedral top portion having three integrally connected outwardly tapered wall members integrally connected at one of their ends to said three upstanding wall members, two of said tapered wall members being integrally connected at their respective side ends to said first connector wall for helping to define a top container space for receiving and supporting an intermediate portion of the stems in a loose grouping to facilitate the addition of long stem greens between selected ones of the long stems of said bunch of flowers for flower arrangement purposes.

10. A vase construction according to claim 9, wherein said second container further includes:

another semi hexagonal base portion having three integrally connected upstanding wall members, two of said three wall members being integrally connected at one of their respective ends to said second connector wall for helping to define another bottom container space for receiving and supporting a bottom portion of the stems of said another bunch of flowers in a tight compact grouping for flower arrangement purposes; and another trihedral top portion having three integrally connected outwardly tapered wall members integrally connected at one of their ends to said three upstanding wall members, two of said tapered wall members being integrally connected at their respective side ends to said second connector wall for helping to define another top container space for receiving and supporting an intermediate portion of the stems in a loose grouping to facilitate the addition of long stem greens between selected ones of said another bunch of flowers for flower arrangement purposes.

11. A vase construction comprising:

an elongated first container means forming a first flower receiving compartment for receiving and supporting from below a bunch of long stem flowers, said first container means including an elongated common wall member having a centrally disposed recess extending along the axial length thereof for helping said first container means to be secured to an upright pole for vase stabilization purposes;

an elongated second container means forming a second flower receiving compartment for receiving and supporting from below another bunch of long stem flowers, said second container means including another elongated common wall member having another centrally disposed recess extending along the axial length thereof for helping said second container means to be secured to an upright pole for vase stabilization purposes;

wherein each of said elongated container means includes an elongated base means integrally connected to its associated common wall member and having a generally narrow width for defining a bottom stem receiving space to receive and support a bottom portion of the bunch of long stem flowers in a tight grouping to hold the long stem flowers in an upright manner;

an elongated top means integrally connected to its associated common wall member and having a generally wide mouth for defining a top stem receiving space to receive and support an intermediate portion of the stems in a loose grouping to facilitate the addition of long stem greens between selected ones of the long stems of said bunch of flowers for flower arrangement purposes; and a continuous connector means integrally connected to said first and second container means and extending in the direction of the axial length of said elongated common wall members for helping to secure removably the vase construction to an upright pole;

wherein said continuous connector means comprises:

outwardly projecting elongated splines that extend continuously along said second common wall member wherein said splines are parallel to one another;

elongated grooves or openings that extend continuously along said first common wall member, said grooves being parallel to one another and consimilarly configured to said splines and said grooves are adapted to receive said splines to facilitate the alignment of said first and second common wall members;

locking tabs at least at said top portion of said second common wall member; and notches at least at said top portion of said first common wall for receiving said locking tabs to facilitate the interconnection of said first and second common wall members.

12. A vase construction according to claim 11, wherein said common wall members have a longitudinal length that is twice the longitudinal length of the base means and the top means.

13. A vase construction comprising:

an elongated first container means forming a first flower receiving compartment for receiving and supporting from below a bunch of long stem flowers, said first container means including an elongated common wall member having a centrally disposed recess extending along the axial length thereof for helping said first container means to be secured to an upright pole for vase stabilization purposes;

an elongated second container means forming a second flower receiving compartment for receiving and supporting from below another bunch of long stem flowers, said second container means including another elongated common wall member having another centrally disposed recess extending along the axial length thereof for helping said second container means to be secured to an upright pole for vase stabilization purposes;

wherein each of said elongated container means includes an elongated base means integrally connected to its associated common wall member and having a generally narrow width for defining a bottom stem receiving space to receive and support a bottom portion of the bunch of long stem flowers in a tight grouping to hold the long stem flowers in an upright manner;

an elongated top means integrally connected to its associated common wall member and having a generally wide mouth for defining a top stem receiving space to receive and support an intermediate portion of the stems in a loose grouping to facilitate the addition of long stem greens between selected ones of the long stems of said bunch of flowers for flower arrangement purposes; and a continuous connector means integrally connected to said first and second container means and extending in the direction of the axial length of said elongated common wall members for helping to secure removably the vase construction to an upright pole;

wherein said continuous connector means comprises:

outwardly projections elongated splines that extend continuously along said second common wall member wherein said splines are parallel to one another;

elongated grooves or openings that extend continuously along said first common wall member, said grooves being parallel to one another and consimilarly configured to said splines and said grooves are adapted to receive said splines to facilitate the alignment of said first and second common wall members;

locking tabs at least at said top portion of said second common wall members;

notches at least at said top portion of said first common wall members for receiving said locking tabs to facilitate the interconnection of said first and second common wall members;

locking tabs at said base portion of said first common wall members; and notches at said base portion of said second common wall member for receiving said locking tabs to facilitate the interconnection of said first and second common wall members.

14. A vase construction according to claim 13, wherein said common wall members have a longitudinal length that is twice the longitudinal length of the base means and the top means.

15. A vase construction comprising:

a first elongated container forming a first flower receiving compartment for receiving and for supporting from below a bunch of long stem flowers, said container having a first connector wall with a centrally disposed recess extending the entire longitudinal length thereof, said recess having a sufficient depth and width to partially receive therein a pole for helping to support said first container in a substantially upright manner;

said first elongated container further including:

a base portion having integrally connected upstanding wall members being integrally connected to said first connector wall for helping to define a bottom container space for receiving and supporting a bottom portion of the stems of said bunch of flowers in a tight compact grouping for flower arrangement purposes; and a top portion having integrally connected outwardly tapered wall members integrally connected to said first connector wall for helping to define a top container space for receiving and supporting an intermediate portion of the stems in a loose grouping to facilitate the addition of long stem greens between selected ones of the long stems of said bunch of flowers for flower arrangement purposes;

a second elongated container forming a second flower receiving compartment separate from said first compartment and for receiving and supporting from below another bunch of long stem flowers, said second container having a second connector wall with another centrally disposed recess extending the entire longitudinal length thereof, said another recess having a sufficient depth and width to partially receive therein another portion of said pole for helping to support said second container in a substantially upright manner;

said second elongated container further including:
   another base portion having integrally connected upstanding wall members being integrally connected to said second connector wall for helping to define another bottom container space for receiving and supporting a bottom portion of the stems of said another bunch of flowers in a tight compact grouping for flower arrangement purposes; and
   another top portion having integrally connected outwardly tapered wall members integrally connected to said second connector wall for helping to define another top container space for receiving and supporting an intermediate portion of the stems of said another bunch of flowers in a loose grouping to facilitate the addition of long stem greens between selected ones of said another bunch of long stem flowers for flower arrangement purposes; and said first and second connector walls further including:
   outwardly projecting elongated splines that extend along said second connector wall wherein said splines are parallel to one another;
   elongated grooves or openings that extend along said first connector wall, said grooves being parallel to one another and consimilarly configured to said splines wherein said grooves are adapted to receive said splines to facilitate the alignment of said first and second connector walls;
   locking tabs at least at said top portion of said second connector wall; and
   notches at least at said top portion of said first connector wall for receiving said locking tabs to facilitate the interconnection of said first and second connector walls.

16. A vase construction according to claim 15, wherein said first and second connector walls further include:
   locking tabs at said base portion of said first connector wall; and
   notches at said base portion of said second connector wall for receiving said locking tabs to facilitate the interconnection of said first and second connector walls.

* * * * *